United States Patent
Ishii et al.

(10) Patent No.: US 8,930,816 B2
(45) Date of Patent: Jan. 6, 2015

(54) IMAGE REPRODUCING APPARATUS, METHODS, AND RECORDING MEDIA FOR REPRODUCING AND DISPLAYING IMAGES WHILE SWITCHING IMAGES

(75) Inventors: Hideki Ishii, Toyoake (JP); Mika Matsushima, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 596 days.

(21) Appl. No.: 12/749,502

(22) Filed: Mar. 29, 2010

(65) Prior Publication Data

US 2010/0275140 A1      Oct. 28, 2010

(30) Foreign Application Priority Data

Apr. 23, 2009   (JP) ................................ 2009-105125

(51) Int. Cl.
*G06F 3/00* (2006.01)
*G06F 3/048* (2013.01)
*G06F 17/30* (2006.01)

(52) U.S. Cl.
CPC .... *G06F 17/30056* (2013.01); *G06F 17/30265* (2013.01); *H04N 2201/3214* (2013.01); *H04N 2201/3215* (2013.01); *H04N 2201/3274* (2013.01); *H04N 2201/3253* (2013.01); *H04N 2201/3226* (2013.01)
USPC .......................................... 715/730; 715/764

(58) Field of Classification Search
USPC ........................................................ 715/764
See application file for complete search history.

(56) References Cited

U.S. PATENT DOCUMENTS

| | | | |
|---|---|---|---|
| 2007/0143376 A1* | 6/2007 | McIntosh ...................... 707/205 |
| 2007/0300158 A1* | 12/2007 | Kasperkiewicz et al. ..... 715/731 |
| 2008/0229235 A1* | 9/2008 | Vau et al. ...................... 715/784 |
| 2008/0309795 A1 | 12/2008 | Mitsuhashi et al. | |

FOREIGN PATENT DOCUMENTS

| | | |
|---|---|---|
| JP | 2003-069876 A | 3/2003 |
| JP | 2006-173984 A | 6/2006 |
| JP | 2008-225562 A | 9/2008 |

* cited by examiner

*Primary Examiner* — Stephen Alvesteffer
(74) *Attorney, Agent, or Firm* — Baker Botts L.L.P.

(57) ABSTRACT

An image reproducing apparatus sets event information including date of an event and retrieves a related image from images stored in a storing device on the basis of the event information. The image reproducing apparatus calculates an event waiting period from present date to the date of the event, determines display ratio for inserting the retrieved related image into images to be reproduced on the basis of the event waiting period, and displays an event related image group obtained by inserting the related image into the images to be reproduced at the display ratio.

8 Claims, 17 Drawing Sheets

FIG. 3

| IMAGE ID | DATE OF IMAGING | GPS LATITUDE | GPS LONGITUDE | EVENT FLAG | EVENT REMINDED FLAG | RELATED TEMPLATE FLAG |
|---|---|---|---|---|---|---|
| KIF-0010 | 2006/10/13 11:20:00 | 32° 52' 6.0" NORTH LATITUDE | 131° 37' 23.1" EAST LONGITUDE | WED | ON | ON |
| KIF-0011 | 2006/10/13 11:32:45 | 32° 52' 6.1" NORTH LATITUDE | 131° 37' 37" EAST LONGITUDE | WED | ON | |
| KIF-0012 | 2006/10/13 12:30:20 | 32° 52' 15" NORTH LATITUDE | 131° 37' 41.2" EAST LONGITUDE | WED | | |
| ⋮ | ⋮ | ⋮ | ⋮ | ⋮ | ⋮ | ⋮ |
| DSO-1000 | 2006/12/25 18:20:10 | 35° 15' 15" NORTH LATITUDE | 139° 22' 10.0" EAST LONGITUDE | BIR_M | | ON |
| ⋮ | ⋮ | ⋮ | ⋮ | ⋮ | ⋮ | ⋮ |

FIG. 4A

| DATE | RATIO |
|---|---|
| ONE MONTH AGO | 10% |
| ... | ... |
| ONE WEEK AGO | 30% |
| ... | ... |
| ONE DAY AGO | 60% |
| ... | ... |

FIG. 4B

| MODE | DATE | THE NUMBER OF RELATED IMAGE DISPLAYS |
|---|---|---|
| THREE-IMAGE DISPLAY MODE | ONE MONTH AGO | ONE PER FIVE SCREENS (15 IMAGES) |
| ... | ... | ... |
| FOUR-IMAGE DISPLAY MODE | TWO DAYS AGO | TWO |
| FOUR-IMAGE DISPLAY MODE | ONE DAY AGO | THREE |
| FOUR-IMAGE DISPLAY MODE | ON THE DAY (AT 0:00) | FOUR |
| ... | ... | ... |

FIG. 4C

| DATE | RATIO | RELATED IMAGE DISPLAY TIME |
|---|---|---|
| ONE MONTH AGO | ONE FOR SIX HOURS | FIVE MINUTES |
| ... | ... | ... |
| TWO DAYS AGO | ONE FOR 30 MINUTES | TWO MINUTES |
| ONE DAY AGO | ONE FOR 30 MINUTES | FIVE MINUTES |
| ON THE DAY (AT 0:00) | THROUGHOUT 24 HOURS | THROUGHOUT 24 HOURS |
| ... | ... | ... |

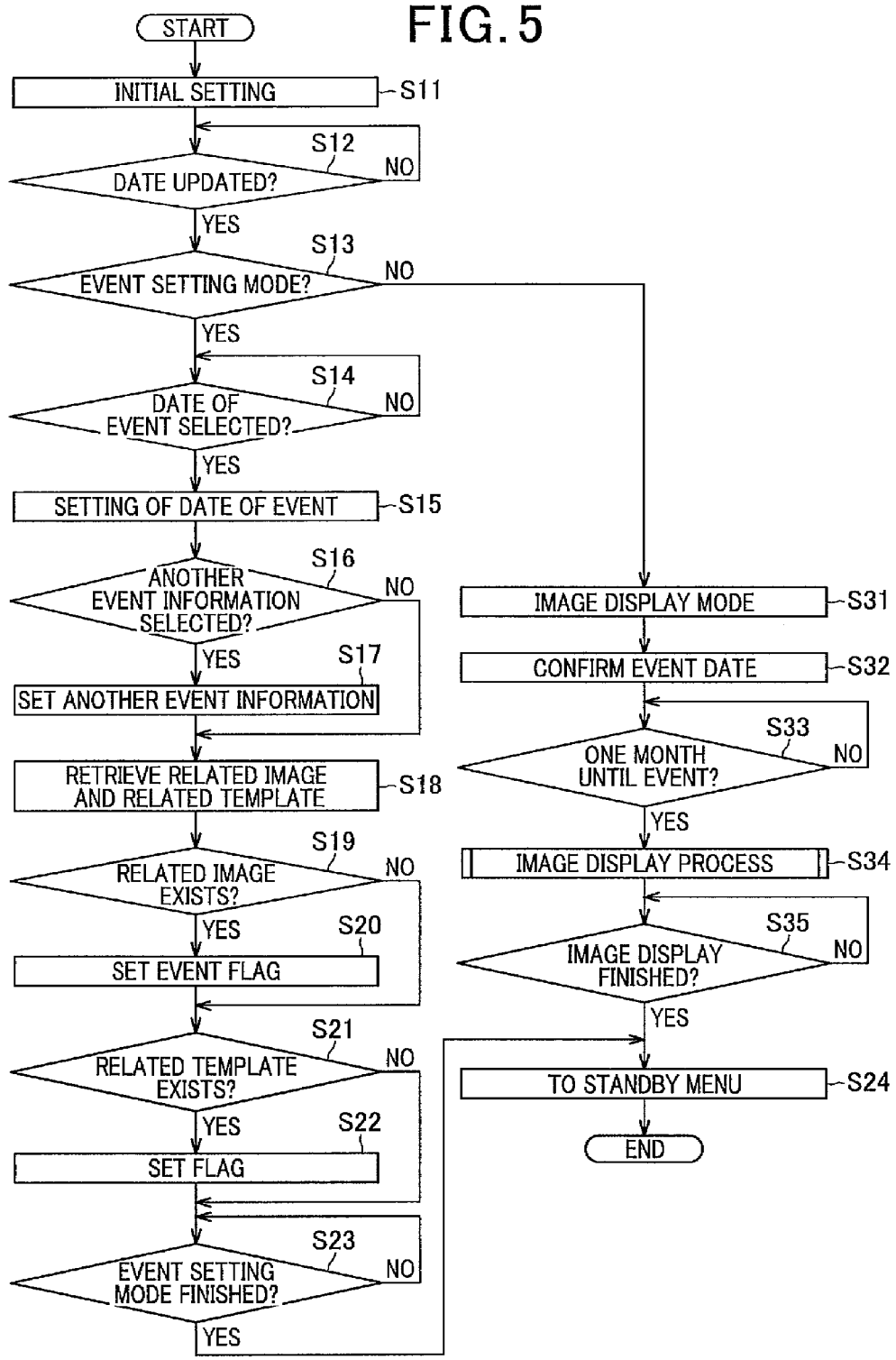

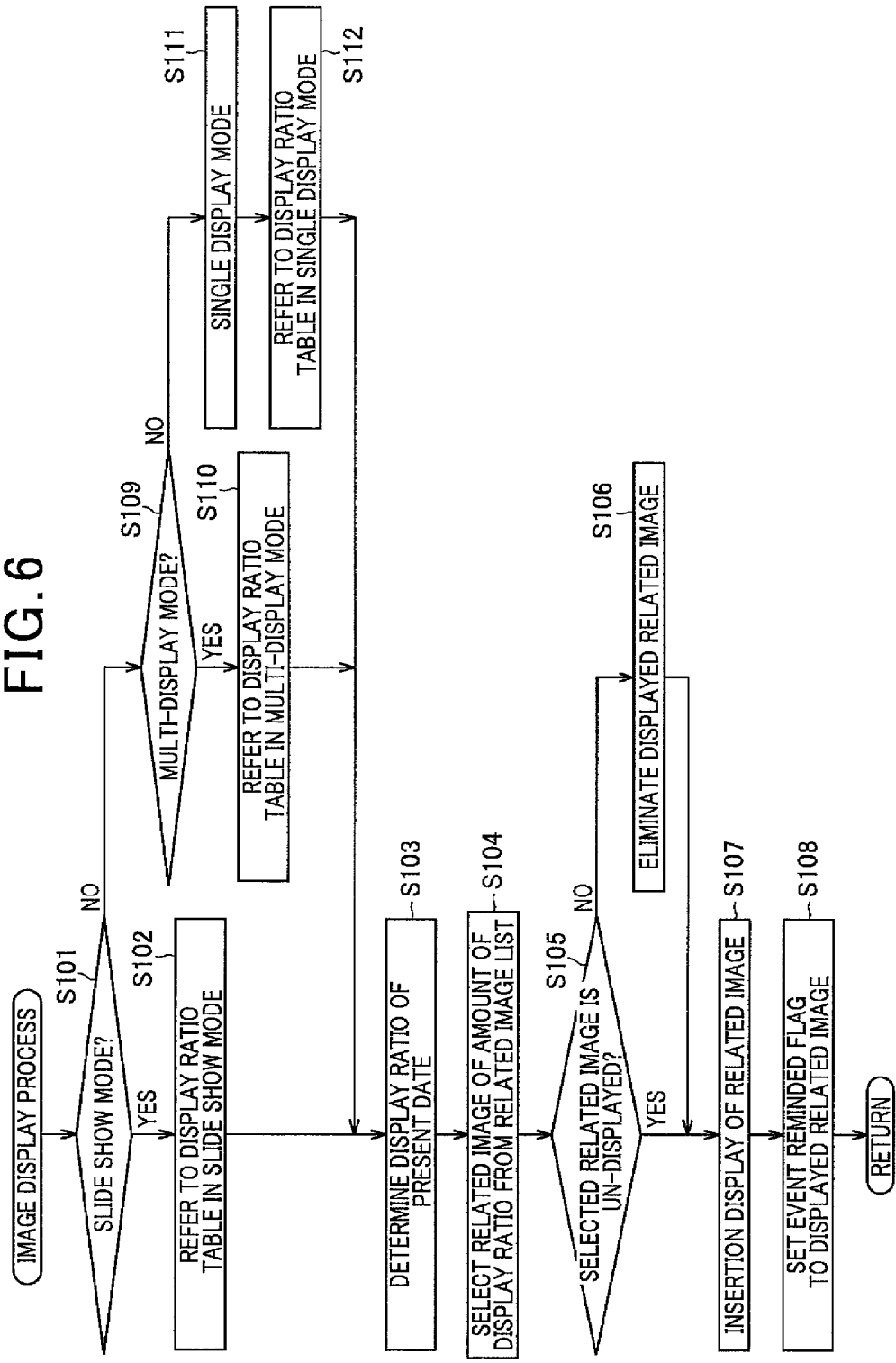

SETTING OF EVENT DATE
OCTOBER 200X

| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 |

SETTING OF EVENT DATE
APRIL 200X

| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 |

FIG. 10A

ENTRY OF IMAGE ID

ENTRY FIELD: KIF-0010  (DETERMINE)

SELECTION OF KIND OF EVENT

WEDDING ANNIVERSARY

BIRTHDAY

X' MAS (DETERMINE)

END OF EVENT SETTING MODE

END

SELECTION OF DISPLAY MODE

SLIDE SHOW MODE

MULTI-DISPLAY MODE

SINGLE DISPLAY MODE

DETERMINE

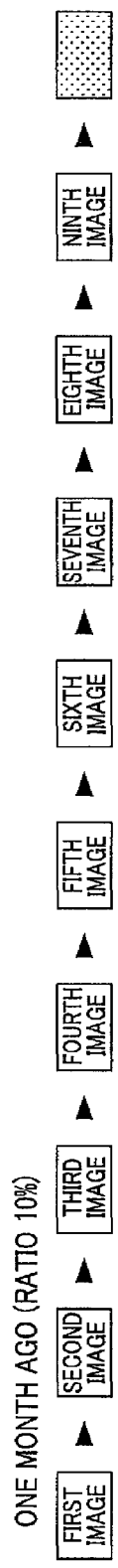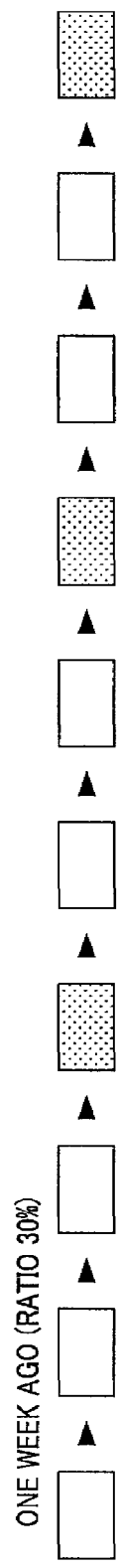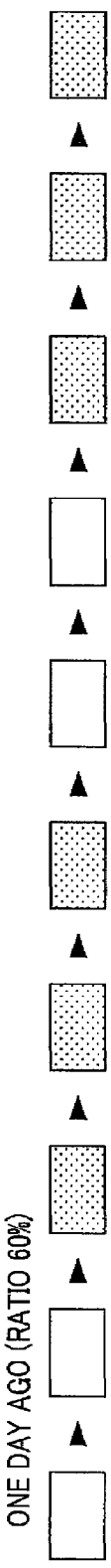

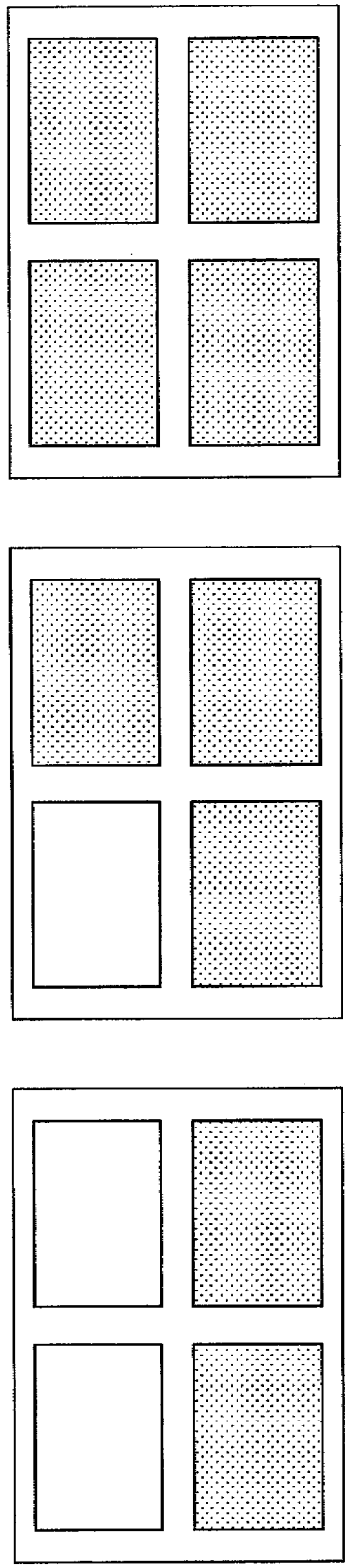

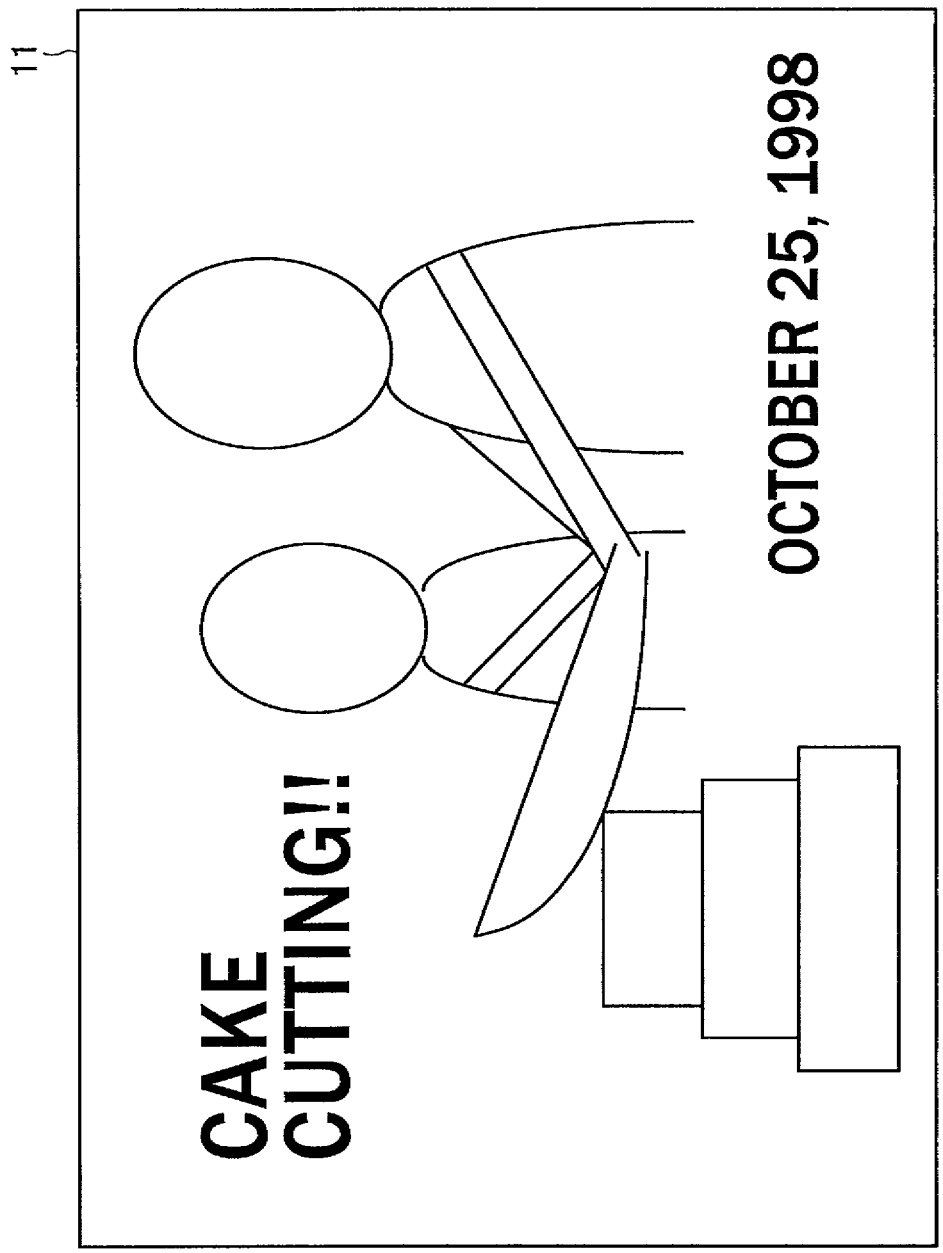

US 8,930,816 B2

IMAGE REPRODUCING APPARATUS, METHODS, AND RECORDING MEDIA FOR REPRODUCING AND DISPLAYING IMAGES WHILE SWITCHING IMAGES

The entire disclosure of the Japanese Patent Application No. 2009-105125, including the specification, the scope of claims, drawings, and abstract, filed on Apr. 23, 2009 is incorporated herein by reference in its entirety.

BACKGROUND OF THE INVENTION

1. Field of the Invention

The present invention relates to an image reproducing apparatus such as a digital photo frame, an image reproducing method, and a program.

2. Description of the Related Art

Hitherto, an electronic calendar, a camera, an image reproduction system, and the like for reproducing and displaying images while switching the images are devised.

The electronic calendar has a display screen having a display unit. On the display screen, date information of calendar, calendar body, and decoration of the calendar are displayed. The calendar decoration is to display, for example, a photograph related to date information.

SUMMARY OF THE INVENTION

However, in photograph display linked with the calendar, a photograph is not displayed until the date. Therefore, in the case where preparation such as a present is necessary for an anniversary, sufficient reminding effect cannot be obtained until an anniversary. For such an anniversary, creation of atmosphere until the date is important. Simple alarm and simply display of a photograph is not suitable for a scene of such family communication.

The present invention has been achieved in view of the above points, and it is an object of the invention to provide an image reproducing apparatus, an image reproducing method, and a recording medium recording a program, producing a reminding effect, and creating atmosphere for family communication.

In order to solve the above problem, the invention according to claim 1 relates to an image reproducing apparatus for reproducing and displaying images while switching the images, comprising:

an event information setting device configured to set event information including date of an event;

a retrieving device configured to retrieve a related image from images stored in a storing device on the basis of the event information set by the event information setting device;

a period calculating device configured to calculate an event waiting period from present date to date of the event;

a display ratio determining device configured to determine display ratio for inserting the related image retrieved by the retrieving device into images to be reproduced on the basis of the event waiting period calculated by the period calculating device; and a display control device configured to display an event related image group obtained by inserting the related image into the images to be reproduced at the display ratio determined by the display ratio determining device.

The invention according to claim 8 relates to an image reproducing method of reproducing images while switching the images, comprising:

an event information setting step of setting event information including date of an event;

a retrieving step of retrieving a related image from a stored image on the basis of the event information set in the event information setting step;

a period calculating step of calculating an event waiting period from present date to date of the event;

a display ration determining step of determining display ratio for inserting the retrieved related image into images to be reproduced on the basis of the event waiting period calculated in the period calculating step; and a display control step of displaying an event related image group obtained by inserting the related image into the images to be reproduced at the display ratio.

The invention according to claim 9 relates to a computer-readable recording medium recording a program to be performed, the program making a computer function as:

an image reproducing device configured to reproduce images while switching the images;

an event information setting device configured to set event information including date of an event;

a retrieving device configured to retrieve a related image from an image stored in a storing device on the basis of the event information set by the event information setting device;

a period calculating device configured to calculate an event waiting period from present date to date of the event;

a display ratio determining device configured to determine display ratio for inserting the related image retrieved by the retrieving device into images to be reproduced on the basis of the event waiting period calculated by the period calculating device; and a display control device configured to display an event related image group obtained by inserting the related image into the images to be reproduced at the display ratio.

BRIEF DESCRIPTION OF DRAWINGS

FIG. 3 is a table showing image attachment information of photographic images.

FIG. 4A is a table showing the display ratio of a related image in a slide show mode, FIG. 4B is a table showing the display ratio of a related image in a multi-display mode, and FIG. 4C is a table showing the display ratio of a related image in a single display mode.

FIG. 5 is a flowchart showing control process of the image reproducing apparatus illustrated in FIG. 1.

FIG. 6 is a flowchart of the image display process shown in FIG. 5.

FIG. 10A is a schematic view of a display screen for entering image ID, and

FIG. 10B is a schematic view of a display screen for selecting the kind of an event.

FIGS. 12A, 12B, and 12C are schematic views showing an event related image group displayed in a slide show mode before the date of an event.

FIGS. 13A, 13B, and 13C are schematic views showing an event related image group displayed in a multi-display mode before the date of an event.

FIG. 15 is a schematic view of a display screen displaying a related image and a related template of a wedding anniversary.

DESCRIPTION OF THE PREFERRED EMBODIMENTS

Figure 1:
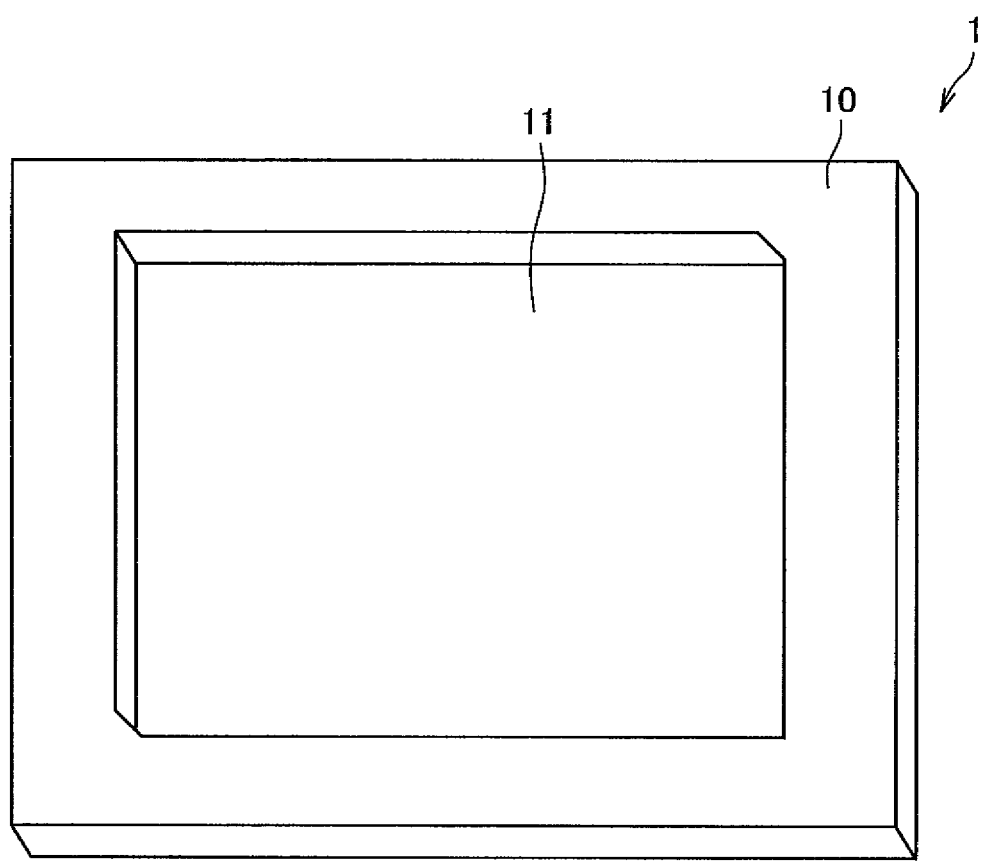
FIG. 1 is a schematic diagram showing the appearance of an image reproducing apparatus according to an embodiment.

Best embodiments of the invention will be described below with reference to the drawings. In an embodiment to be described below, the present invention is applied to an image reproducing apparatus 1 that reproduces and displays images while switching them. As shown in FIG. 1, the image reproducing apparatus 1 has a rectangular frame 10 having a recessed part and a display unit 11 mounted in the recessed part of the frame 10.

Figure 2:
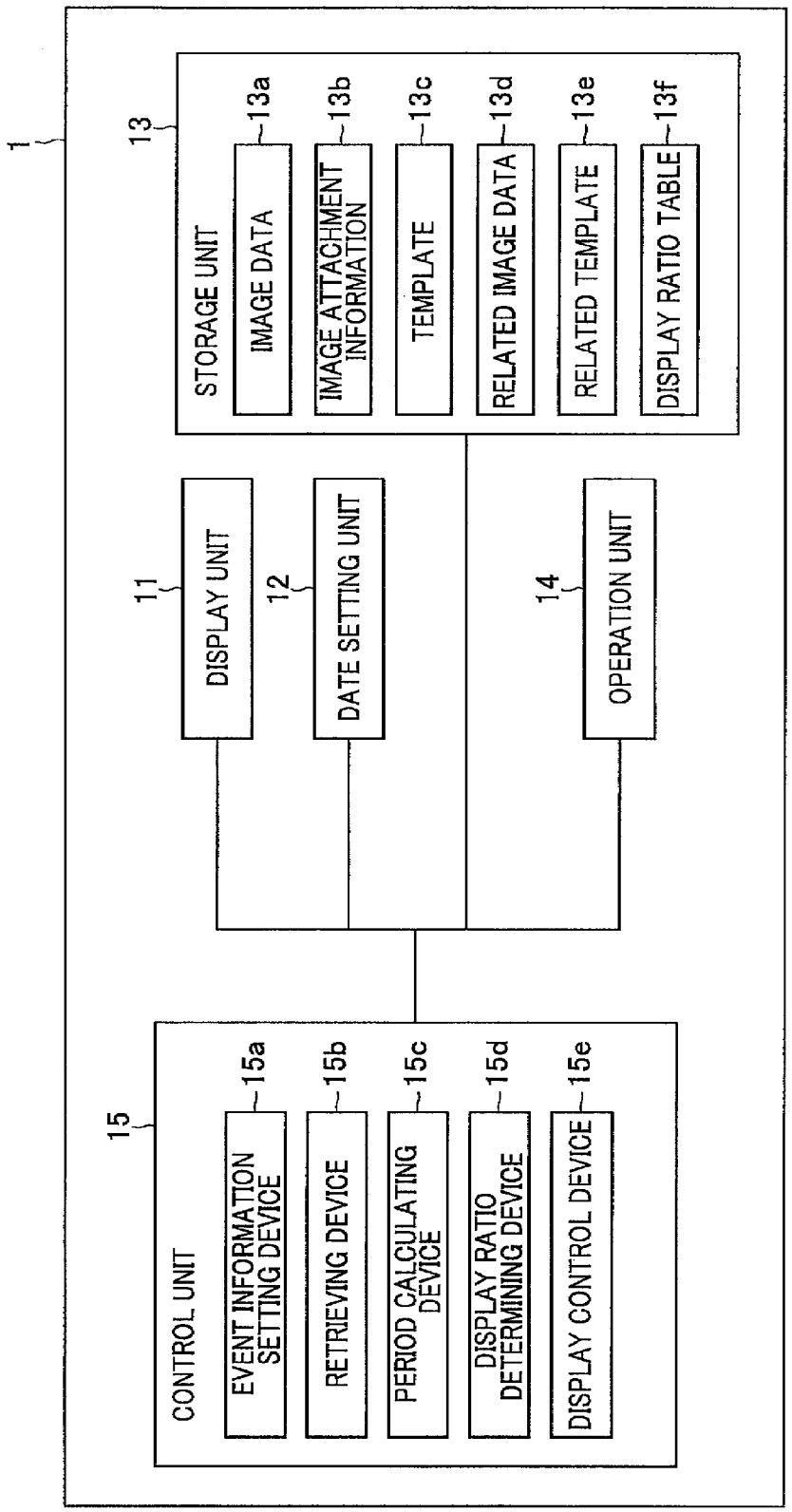
FIG. 2 is a block diagram showing a schematic configuration of the image reproducing apparatus illustrated in FIG. 1.

As shown in FIG. 2, the image reproducing apparatus 1 has, in addition to the display unit 11, a date setting unit 12 for setting date, a storage unit 13, an operation unit 14, and a control unit 15 for controlling the units 11, 12, 13, and 14 in a centralized manner.

The display unit 11 has a panel made of, for example, liquid crystal or organic Electro-Luminescence (EL). On the display screen of the display unit 11, an image, a calendar, a character string, a graphical User Interface screen (GUI screen), and buttons displayed on the GUI screen (GUI buttons). An image is, for example, a photographic image.

The date setting unit 12 is constructed by a timer circuit and has a clock function of calculating time and a calendar function of calculating date (date/month/year).

The storage unit 13 is, for example, a flash memory drive or hard disk drive. The storage unit 13 stores image data 13a related to a photographic image, image attachment information 13b associated with the photographic image, and a template 13c of illustrations, character strings, and the like. The image attachment information 13b is information accompanying a photographic image and is, for example, date of imaging, an imaging place made of GPS latitude and longitude, an image ID peculiar to each image, and a tag for retrieving a tag (keyword) (refer to FIG. 3 (a tag field is not shown)). The storage unit 13 stores related image data 13d of a related image retrieved from the image data 13a and a related template 13e retrieved from the template 13c. The storage unit 13 stores a display ratio table 13f that determines the display ratio of a related image (refer to FIG. 4).

The operation unit 14 has, for example, a menu switch for selecting a menu displayed on a GUI screen and a function button for determining the selected menu. The menu switch and the function button are mounted, for example, on the back side of the frame 10. The operation unit 14 may use a remote controller.

The control unit 15 has a Central Processing Unit (CPU) for generally controlling the image reproducing apparatus 1, a Read Only Memory (ROM) storing a control program of the CPU, and a Random Access Memory (RAM) temporarily storing data necessary for the control process of the CPU. The control unit 15 performs display control with reference to a table specifying image switch time and display order. The table is stored in the storage unit 13. The control unit 15 writes the table in the RAM from the storage unit 13 and uses the table.

The control unit 15 functions as an event information setting device 15a, a retrieving device 15b, a period calculating device 15c, a display ratio determining device 15d, and a display control device 15e of the present invention.

Specifically, the event information setting device 15a sets event information including date (date/month/year) of an event. The event information includes, except for the date (date/month/year) of an event, for example, the place of the event, an image ID, the kind of the event, and the like.

The retrieving device 15b retrieves a related image on the basis of the event information set from a photographic image stored in the storage unit 13.

The period calculating device 15c calculates an event waiting period from the present date to the date of the event.

The display ratio determining device 15d determines the display ratio for inserting the related image to a photographic image to be reproduced in a display mode on the basis of the event waiting period.

The display control device 15e displays an event related image group in which related images are inserted in the photographic images to be reproduced at the display ratio on the display screen of the display unit 11 in the display mode.

The event is, for example, an anniversary such birthday or wedding anniversary or an annual event such as X'mas, new year's day, or Bon (Buddhist event). The related image is, for example, a photographic image captured at the event. The display mode has, for example, a slide show mode, a multi-display mode, and a single display mode.

The display ratio determining device 15d will be described in detail. As the event waiting period becomes shorter, the display ratio of the related image is increased. As the event waiting period becomes shorter, the display ratio determining device 15d increases the number of related images displayed among the number of photographic images to be reproduced in the slide show mode and the multi-display mode. As the event waiting period becomes shorter, the display ratio determining device 15d increases display time of related images in display time of a fixed photographic image in the single display mode.

Next, the control process of the image reproducing apparatus 1 will be described with reference to FIG. 5.

In the control process shown in FIG. 5, when the user turns on the power supply, the control unit 15 executes the control program of the ROM and starts the control.

Figure 7:
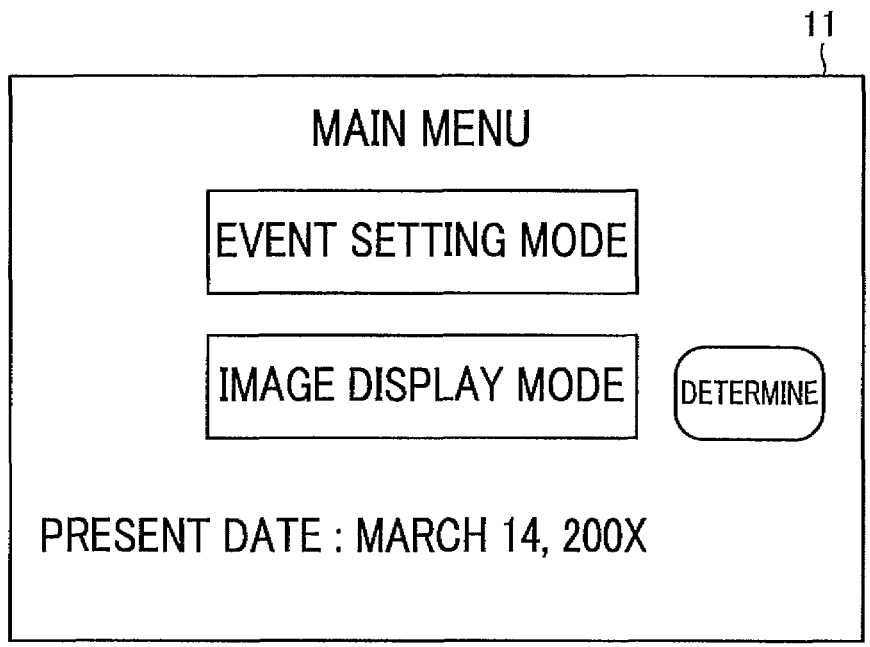
FIG. 7 is a schematic view showing a display screen of a main menu.

First, the control unit 15 executes initial setting (S11). In the initial setting, as shown in FIG. 7, a main menu screen having present date and GUI buttons indicative of an "event setting mode" and an "image display mode" is displayed on the display screen of the display unit 11. The "event setting mode" is a mode of setting event information such as the date of an event. The "image display mode" is a mode of displaying an event related image group in various display modes.

Subsequently, in the process of step S12, the control unit 15 determines whether the date was updated or not (S12). In the case where it is determined that the date is updated by the process in S12 (YES in S12), the control unit 15 determines whether the event setting mode is set or not (S13). In the case where it is determined that the date is not updated (NO in S12), the control unit 15 executes the process of step S12 again.

Concretely, in the process of step S12, the control unit 15 reads the present date information from the date setting unit 12, stores it to the RAM, and determines whether the date is updated or not. Date is updated after 24:00 by the clock function of the date setting unit 12.

In the case where it is determined that the event setting mode is selected in the process of step S13 (YES in S13), the control unit 15 selects the date of an event (S14). In the case where it is determined that the event setting mode is not selected in step S13 (NO in S13), the control unit 15 executes the image display mode (S31).

Concretely, when it is determined in the process of step S13 that the user selects and determines the "event setting mode" on the display screen shown in FIG. 7 by the operation unit 14 (YES in S13), the event information setting device 15a in the control unit 15 executes event information setting process (S14 to S17). In the case where the user does not select the event setting mode (NO in S13), the control unit 15 automatically executes the image display mode. That is, the control unit 15 may skip the image display mode (S31) and execute the process of confirming the date of an event (S32) and the subsequent processes.

In the case where it is determined in the process of step S14 that the date of the event is selected (YES in S14), the event information setting device 15a sets the date of the event (S15). In the case where it is determined that the date of the event is not selected (NO in S14), the event information setting device 15a repeats the process of step S14.

Figure 8A:
FIGS. 8A and 8B are schematic views each showing a display screen for setting date of an event.
Figure 8B:

Concretely, the event information setting device 15a displays a calendar showing date, month, and year on the GUI screen of the display unit 11 as shown in FIGS. 8A and 8B. Each of the date, month, and year of the calendar is set as a GUI button. The user selects date, month, and year (Oct. 25, 200X in FIG. 8A, or Apr. 6, 200X in FIG. 8B) on the calendar matching the date (date, month, year) of the event by the operation unit 14 and determines it (YES in S14). Under the condition of selecting the event date, the event information setting device 15a sets the selected date as the date of the event of the event information (S15). The event information setting device 15a stores the date of the event as the event date information in the RAM and the storage unit 13. The event information setting device 15a displays a date selection box and a software keyboard of numerals on the display screen of the display unit 11 and the user may enter numerals matching the date of the event into the selection box with the software keyboard.

In the case where it is determined in the process of step 516 that another event information is selected (YES in S16), the event information setting device 15a sets another event information (S17). When it is determined that in the process of step S16 that another event information is not selected (NO in S16), the event information setting device 15a executes retrieval of a related image and the like (S18).

Figure 9A:
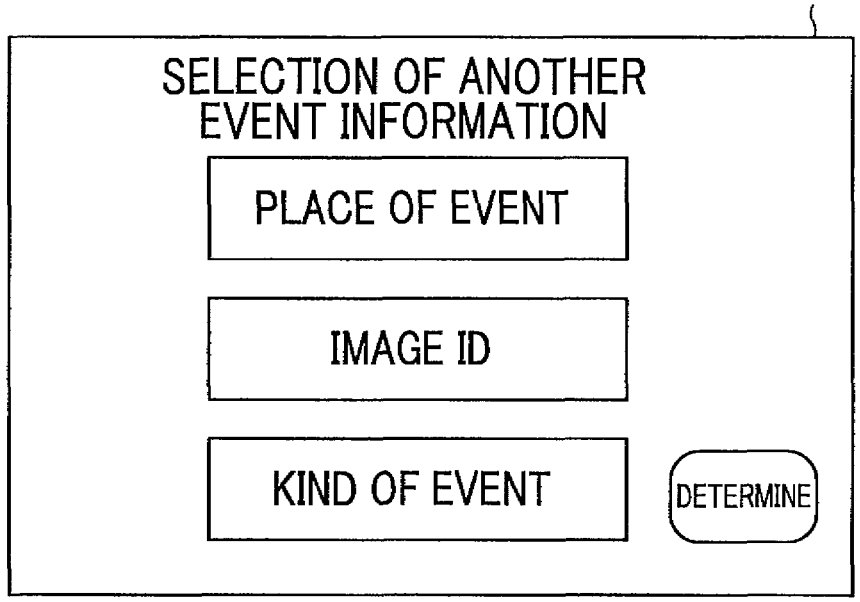
FIG. 9A is a schematic view of a display screen for selecting another event information.

Concretely, the event information setting device 15a displays, as shown in FIG. 9A, GUI buttons indicative of "place of event", "image ID", and "kind of event" as another event information on the GUI screen of the display unit 11. The "place of event" denotes a place where an image on an event is captured. For example, when the event is wedding anniversary, the "place of event" is the place where a wedding ceremony was done. When the event is a birthday, the "place of event" is the place where the person was born or the like. The "image ID" is a character string for recognition given to the image. The "kind of event" is a kind of events grouped and is, for example, an event such as a wedding anniversary or birthday or an annual event such as X'mas.

Figure 9B:
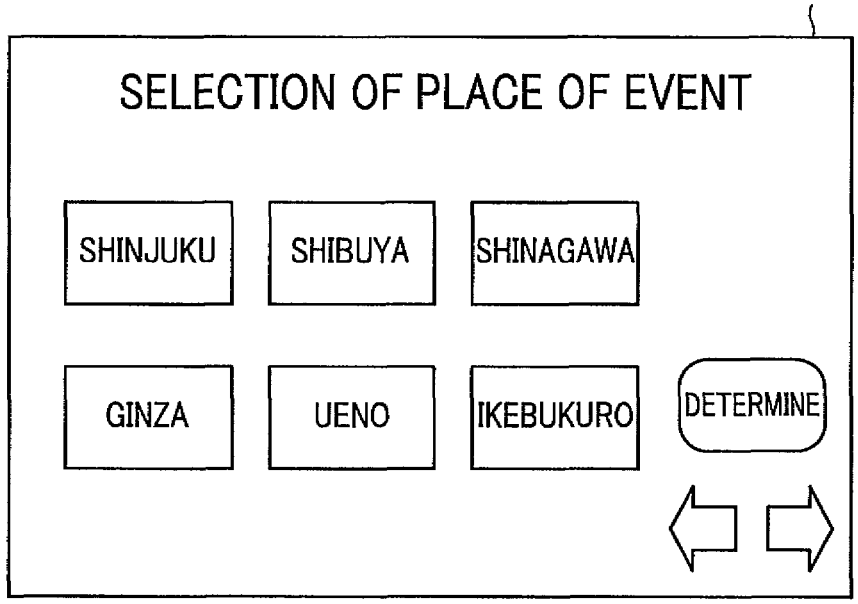
FIG. 9B is a schematic view of a display screen for selecting the place of an event.

In the case where the user selects the GUI button of "place of event" with the operation unit 14 and determines it, as shown in FIG. 9B, the event information setting device 15a displays GUI buttons indicative of place names on the GUI screen of the display unit 11. The user selects the place name matching the place name of the event from the place names displayed by the operation unit 14 and determines it. The event information setting device 15a may display a map on the display screen of the display unit 11 and the user may select a place on the map with the operation unit 14.

When the user selects and determines the GUI button of "image ID" with the operation unit 14, as shown in FIG. 10A, the event information setting device 15a displays an entry field of an image ID and GUI buttons of alphabets and numerals on the GUI screen of the display unit 11. The user selects alphabets and numerals corresponding to all or a part of a string of alphabets and numerals of the image ID such as "KIF-0010" with the operation unit 14, enters them into the entry field, and determines them.

When the user selects and determines the "kind of event" with the operation unit 14, as shown in FIG. 10B, the event information setting device 15a displays GUI buttons indicative of kinds of events such as "wedding anniversary", "birthday", and "X'mas" on the GUI screen of the display unit 11. In this case, the GUI buttons may indicate the names of the events or may display icons indicative of the events. The user selects a GUI button corresponding to the event with the operation unit 14 and determines it. The display unit 11 may display an entry field of a tag (keyword) related to an event and a software keyboard on the display screen, and the user may enter a tag in the input field with the software keyboard and specify the kind of the event.

When the user determines information with respect to the "place of event", "image ID", and "kind of event" with the operation unit 14 in the above, the event information setting device 15a sets the selected information as another event information (S17). The event information setting device 15a writes the another event information in the RAM.

In the process of step S18, the retrieving device 15b of the control unit 15 reads event information made by event date information and another event information from the RAM. The retrieving device 15b collates the event information with the image attachment information of the photographic image and retrieves a related image from the image data stored in the storage unit 13. The retrieving device 15b stores the retrieved related image as the related image data 13d into the storage unit 13. In the case where the kind of the event is set as event information, the retrieving device 15b retrieves the related template 13e from the templates 13c on the basis of the kind of the event. The related template 13e is, for example, an image of an illustration suggestive of the event or a character string suggestive of the event. The retrieving device 15b stores the related template 13e in the storage unit 13.

In FIG. 3, in the case where event information is set by the date of the event, the retrieving device 15b retrieves, as a related image, a photographic image of the imaging date (date/month) matching the date of the event from the image data 13a stored in the storage unit 13. The retrieval of a related image based on the date of the event may be performed on all of past photographic images which are stored or photographic images for a past given period (for example, three years, one year, or three months) since the present date. The predetermined period may vary according to the kind of the event or may be set by the user.

In the case where event information is set by the place of the event, the retrieving device 15b retrieves, as a related image, a photographic image in an imaging place (GPS latitude and longitude) matching the place of the event from the image data 13*a* stored in the storage unit 13.

In the case where event information is set by the image ID, the retrieving device 15*b* retrieves, as a related image, a photographic image having an image ID matching the set alphabets and numerals from the image data 13*a* stored in the storage 13.

The retrieving device 15*b* may retrieve a related image by combining at least one of the place of the event, image ID, and the kind of the event with the date of the event.

For example, when the date of the event of "October 25" is set as event information and "wedding anniversary" is set as the kind of the event, the retrieving device 15*b* retrieves photographic images of imaging date matching "October 25" from the image data stored in the storage unit 13. Further, the retrieving device 15*b* specifies, as a related image, a photographic image estimated as that of a wedding anniversary from the retrieved photographic images by using the image recognition technology.

For example, when the date of the event of "April 6" is set as event information and "birthday" is set as the kind of the event, the retrieving device 15*b* retrieves photographic images whose imaging date is "April 6" from the image data stored in the storage unit 13. Further, the retrieving device 15*b* specifies, as a related image, a photographic image estimated as that of birthday from the retrieved photographic images by using the image recognition technology.

In the case of retrieving a related template, on the basis of the kind of the event, the retrieving device 15*b* retrieves, as related information, related templates of an illustration, a character string, and the like related to an event from templates stored in the storage unit 13. For example, when the kind of the event is a wedding anniversary, the related templates are date of the wedding anniversary, illustration of a wedding cake, and character strings of "wedding anniversary", "congratulations on your wedding", and "cake cutting!!". In the case where the kind of the event is birthday, the related templates are date of the birthday, illustration of a birthday cake, and character strings such as "birthday" and "happy birthday!!".

In the case where it is determined in the process of step S19 that there is a related image (YES in S19), the control unit 15 sets an event flag as image attachment information for the extracted related image (S20, refer to FIG. 3). In the case where it is determined in the process of step S19 that there is no related image (NO in S19), the control unit 15 executes determination of whether there is a related template or not (S21).

In the case where it is determined in the process of step S21 that there is a related template (YES in S21), the control unit 15 sets a flag as image attachment information to a related image corresponding to the related template (S22, refer to FIG. 3). In the case where it is determined in the process of step S21 that there is no related template (NO in S21), the control unit 15 determines whether the event setting mode is finished or not (S23).

In the case where it is determined in the process of step S23 that the event setting mode is finished (YES in S23), the control unit 15 sets the image reproducing apparatus 1 in a standby mode, or displays a menu on the display screen of the display unit 11 (S24). In the case where it is determined in the process of step S23 that the event setting mode is not finished (NO in S23), the control unit 15 executes the process of the step S23 again.

Figures 11A, 11B:
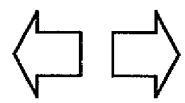
FIG. 11A is a schematic view of a display screen for entering end of an event setting mode.
FIG. 11B is a schematic view of a display screen for selecting a display mode.

That is, in the process of step S23, as shown in FIG. 11A, the control unit 15 displays a GUI button indicative of "end" of the event setting mode on the GUI screen. When the user selects the button of "end" with the operation unit 14, the control unit 15 finishes the event setting mode. In the process of step S24, the control unit 15 sets the image reproducing apparatus 1 in a standby state, and the main menu screen shown in FIG. 7 is displayed on the display screen of the display unit 11.

Next, when it is determined that the event setting mode is selected in the process of step S13 (NO in S13), the image display mode is executed (S31).

Concretely, in the case where it is determined in the process of step S31 that the user selects and determines "image display mode" on the GUI screen of the display unit 11 shown in FIG. 7 with the operation unit 14, the control unit 15 executes processes in the image display mode of step S32 and subsequent steps.

In the process of step S32, the control unit 15 checks the date of the event, stores the present event date information into the RAM from the storage unit 13. The period calculating device 15*e* reads the event date information and the present date information from the RAM and calculates an event waiting period since the present date to the date of the event. The period calculating device 15*c* writes the event waiting period into the RAM.

Next, in the process of step S33, whether the event waiting period calculated in step S32 is one month or less (S33). When it is determined that the event waiting period from the present date to the date of the event is one month or less (YES in S33), the control unit 15 executes image displaying process (S34). When it is determined in the process of step S33 that the event waiting period from the present date to the date of the event is not one month or less (NO in S33), the control unit 15 executes the process of step S33 again. "One month" in step S33 is just an example. The period may be, for example, three months, six months, one year, or the like or may be arbitrarily set by the user.

Next, referring to FIG. 6, the image displaying process in step S34 (FIG. 5) will be described. First, in the process in step S101, the control unit 15 determines whether a slide show mode is selected or not (S101). When it is determined that the slide show mode is selected (YES in S101), the display ratio table in the slide show mode is referred to (S102). On the other hand, when it is determined in the process of step S101 that the slide show mode is not selected (NO in S101), the control unit 15 determines whether the multi-display mode is selected or not (S109).

Concretely, in the process of step S101, as shown in FIG. 11B, GUI buttons of "slide show mode", "multi-display mode", and "single display mode" are displayed on the display screen of the display unit 11. In the case where the user selects the "slide show mode" with the operation unit 14 and determines it, the control unit 15 executes the process in the slide show mode in step S102 and the subsequent steps.

In the process of step S102, the display ratio determining device 15*d* of the control unit 15 writes the display ratio table in the slide show mode shown in FIG. 4A from the storage unit 13 to the RAM and refers to it. For example, when the present date is one month before the date of the event, that is, the event waiting period is one month, the display ratio of the related images in the number of photographic images in the slide show is 10%. When the present date is one week before the date of the event, that is, the event waiting period is one week, the display ratio of the related images in the number of photographic images in the slide show is 30%. When the present date is one day before the date of the event, that is, the event waiting period is one day, the display ratio of the related images in the number of photographic images in the slide show is 60%. As described above, as the event waiting period becomes shorter, the display ratio of related images increases, and the number of related images with respect to the number of photographic images to be reproduced in the slide show increases. As the display ratio, not only the number of images displayed but also display time may be used.

The display ratio determining device 15*d* determines the display ratio of the related images to the number of photographic images (for example, 50 or 100) in the slide show at the present date on the basis of the display ratio table (S103). That is, the control unit 15 checks the display mode which is set and determines the display ratio of related images to the photographic images in the display mode.

Subsequently, in the process of step S104, the control unit 15 selects a plurality of related images corresponding to the display ratio from a list of related images stored in the storage unit 13.

In the process of step S105, the control unit 15 determines whether the related image selected in the process of step S104 is un-displayed or not. In the case where it is determined in the process of step S105 that the selected related image is un-displayed (YES in S105), the control unit 15 executes a process of insertion display of the related image (S107). In the case where it is determined that the selected related image is not un-displayed (NO in S105), the control unit 15 executes a process of eliminating the displayed related image (S106).

In the process of step S106, in the case where the selected related image has been displayed (in the case where an event reminded flag is set for the related image in process of step S108 to be described later), the control unit 15 eliminates the displayed related image from the selected related images. In the case where all of the selected related images have been displayed, the control unit 15 clears the event reminded flag and re-uses the displayed related image.

Next, in the process of step S107, the control unit 15 inserts related images of the number corresponding to the display ratio into predetermined number of photographic images to be reproduced in the slide show, thereby generating an event related image group. The priority of insertion may be reverse chronological order, history (the number of reproduction times), at random, the file number order, the order of addition of photographic images, and descending order of importance determined by the user, or the like. When the related template is retrieved in the process of step S18 (FIG. 5) for the selected related image, the control unit 15 adds the related template to the event related image group.

The display control device 15*e* of the control unit 15 displays the event related image group in the slide show mode on the display screen of the display unit 11 (S107).

Concretely, as shown in FIG. 12A, when the present date becomes one month before the date of the event, the display unit 11 displays the photographic images of the event related image group in order in the slide show and displays one related image in ten photographic images. When the present date becomes one week before the date of the event, as shown in FIG. 12B, the display unit 11 displays three related images in ten photographic images. Further, when the present date becomes one day before the date of the event, as shown in FIG. 12C, the display unit 11 displays six related images in ten photographic images. As described above, as the present date comes closer to the date of the event, the number of related images displayed in the number of photographic images displayed in the slide show increases. Thus, image display is realized which produces reminding effect, makes the user gradually excited, and produces better atmosphere.

Figure 16:
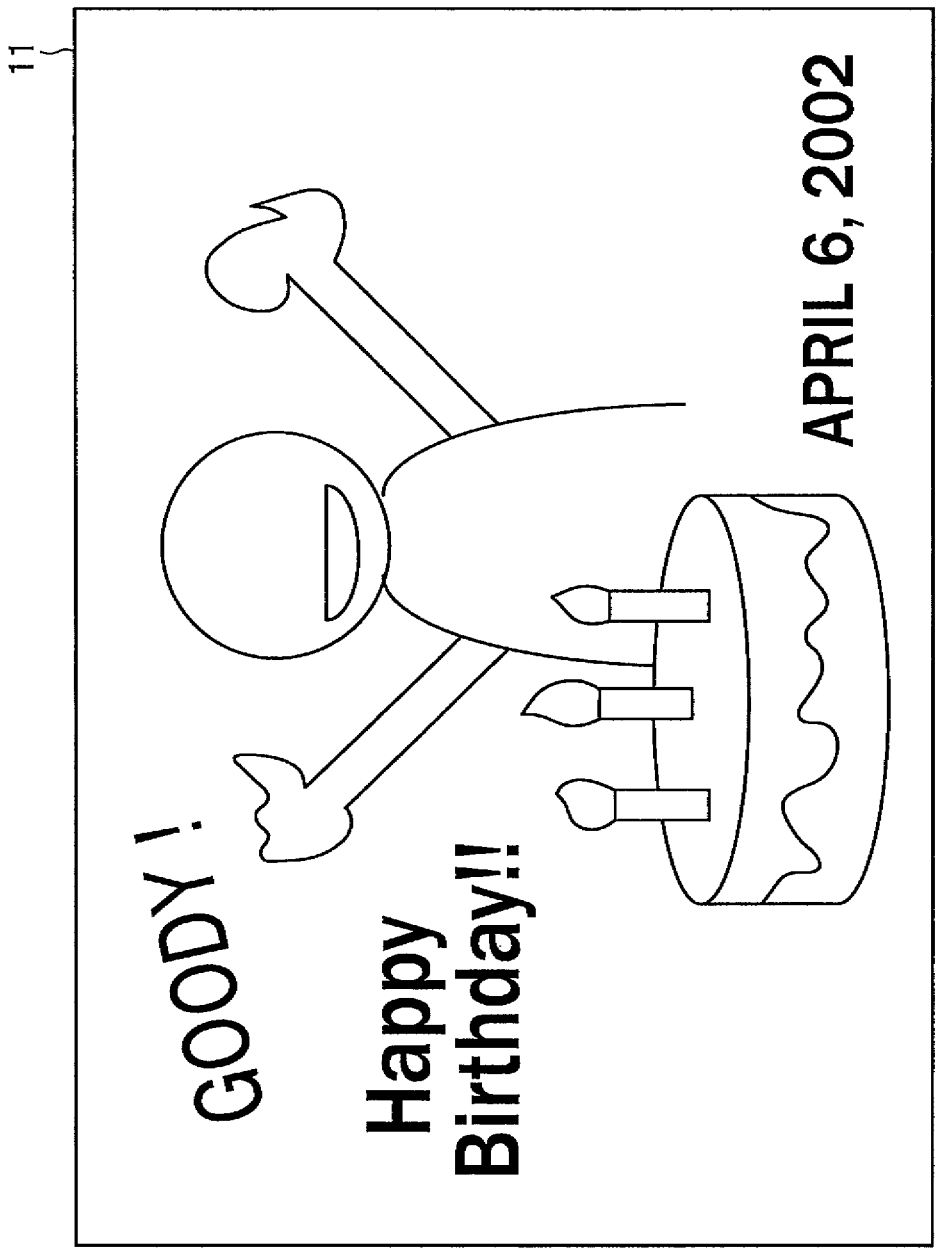
FIG. 16 is a schematic view of a display screen displaying a related image and a related template of a birthday.

In the case where the related template is added to the event related image group, the control unit 15 displays the related template simultaneously with the related image displayed on the display unit 11. The display unit 11 displays, as shown in FIG. 15, for example, wedding anniversary date and a character string of "cake cutting!!" in addition to the photographic image of the wedding anniversary. As shown in FIG. 16, the display unit 11 displays, in addition to the photographic image of birthday, date of birthday and character strings of "goody!" and "happy birthday!!." In such a manner, since the related template is displayed simultaneously with the event related image group, the mood of the user can be further excited.

For example, when birthdays of a plurality of people continue, the number of photographic images of the birthday may be increased as the event waiting period becomes shorter. In this case, the birthday as the related template may be added to the related image.

In the process of step S108, the control unit 15 sets the event reminded flag as the image attachment information for the related image displayed in step S107 (refer to FIG. 3). Since the event reminded flag is set for the displayed related image in the process of step S105 of the next time, it is determined that there is no un-displayed image (NO in S105), and the displayed image is eliminated from the display related images in the process of step S106.

After that, the control unit 15 finishes the image display process (S34) and executes the process of step S35 shown in FIG. 5.

In the case where it is determined in the process of step S35 that the image display has been finished (YES in S35), the control unit 15 sets the image reproducing apparatus 1 into the standby state or displays a screen which was displayed before the image display mode, or the main menu screen (refer to FIG. 7) on the display unit 11 (S24). When it is determined that the image display is not finished (NO in S35), the control unit 15 executes the process of step S35 again.

On the other hand, when it is determined in the process of step S109 that the multi-display mode is selected (YES in S109), the control unit 15 refers to the display ratio table in the multi-display mode (S110). In the case where the multi-display mode is not selected in the process of step S109 (NO in S109), the control unit 15 executes the process (S111) in the single display mode.

Concretely, when the user selects the "multi-display mode" with the operation unit 14 on the display screen of the display unit 11 shown in FIG. 11B in the process of step S109, the control unit 15 executes the process in the multi-display mode in step S110 and the subsequent steps.

In the process of step S110, the display ratio determining device 15*d* in the control unit 15 makes the display ratio table in the multi-display mode shown in FIG. 4B written from the storage unit 13 into the RAM and refers to it. For example, in the case where the present date is one month before the date of the event, that is, the event waiting period is one month, the display ratio of the related images is one out of 15 photographic images corresponding to five screens in a three-image display mode. When the present date is two days before the date of the event, that is, the event waiting period is two days, the display ratio of the related images is two out of four photographic images in a four-image display mode. When the present date is one day before the date of the event, that is, the event waiting period is one day, the display ratio of the related images is three out of four photographic images in the four-image display mode. When the present date is the date of the event, that is, when the event waiting time is zero, the display ratio of the related image is, for example, four out of four photographic images in the four-image display mode. As described above, as the event waiting period becomes shorter, the number of related images displayed out of the number of photographic images to be reproduced in the multi-display mode increases.

After the process of step S110, the control unit 15 executes the processes in steps S103 to S106 described in the above.

In the process of step S107, the control unit 15 inserts related images of the number corresponding to the display ratio into predetermined number of photographic images in the multi-display mode, thereby generating an event related image group. The display control device 15e of the control unit 15 displays the event related image group in the multi-display mode on the display screen of the display unit 11 and executes the process of step S108.

Concretely, as shown in FIG. 13A, when the present date becomes two days before the date of the event, the display unit 11 displays two related images out of four photographic images in the four-image display mode. When the present date becomes one day before the date of the event, as shown in FIG. 13B, the display unit 11 displays three related images out of four photographic images in the four-image display mode. Further, when the present date becomes the date of the event, as shown in FIG. 13C, the display unit 11 displays four related images out of four photographic images in the four-image display mode. As described above, as the present date comes closer to the date of the event, the number of related images in the number of photographic images displayed in the multi-display mode increases. Thus, reminding effect is produced, the user's feeling is gradually uplifted, and better atmosphere can be produced.

On the other hand, in the process of step S111, in the case where the user selects the "single display mode" with the operation unit 14 in the display screen of the display unit 11 shown in FIG. 11B in the process of step S111, the control unit 15 executes the process in the single display mode of step S112 and the subsequent steps.

In the process of step S112, the display ratio determining device 15d in the control unit 15 writes the display ratio table in the single display mode from the storage unit 13 to the RAM and refers to it. In the case where the present date is one month before the date of the event, that is, the event waiting period is one month, as shown in FIG. 4C, one related image is selected every display time of six hours of a stationary photographic image. The display ratio of the related image is five minutes in the display time of six hours of the stationary photographic image. When the present date is two days before the date of the event, that is, the event waiting period is two days, one related image is selected for a stationary photographic image of display time of 30 minutes. That is, 48 related images are selected in one day (24 hours). The display time of the related image is two minutes in the display time of 30 minutes of the stationary photographic image. Further, in the case where the present date is one day before the date of the event, that is, the event waiting period is one day, one related image is selected for the stationary photographic image of the display time of 30 minutes. The display time of the related image is five minutes in the display time of 30 minutes of the stationary photographic image. When the present date is the date of the event, that is, when the event waiting time is zero, the stationary photographic image is replaced with the related image. The display time of the related image is 24 hours in the display time of 24 hours from 0:00 on the day. As described above, as the event waiting period becomes shorter, the display time of the related image in the single display mode decreases, and the display time of the related image in the display time of the stationary photographic image increases.

After execution of the process of step S112, the control unit 15 executes the process in steps S103 to S106. Subsequently, in the process of step S107, the control unit 15 generates an event related image group so that the related image is inserted to the stationary photographic image in display time corresponding to the display interval and the display ratio in the single display mode. The display control device 15e of the control unit 15 displays the event related image group in the single display mode on the display screen of the display unit 11.

Figure 14A:
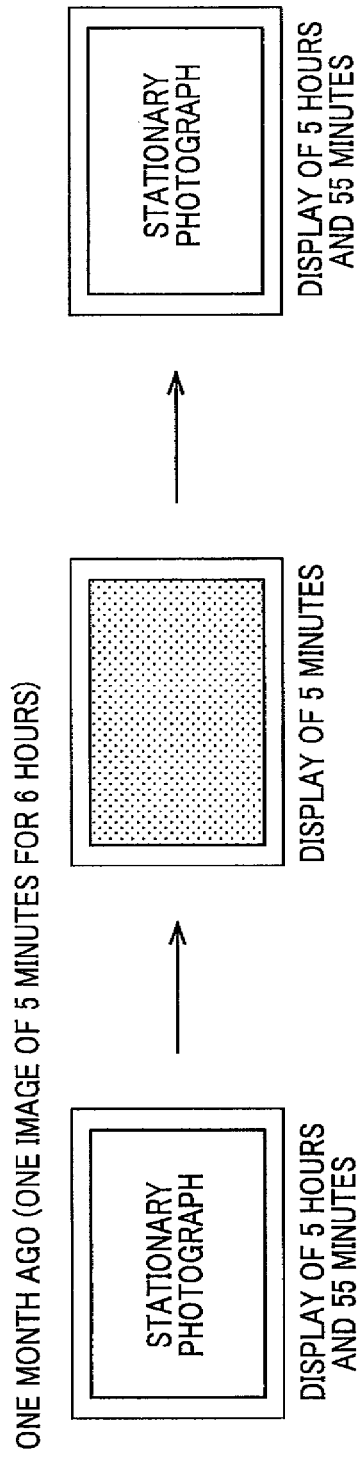
FIGS. 14A and 14B are schematic views showing an event related image group displayed in a single display mode before the date of an event.
Figure 14B:
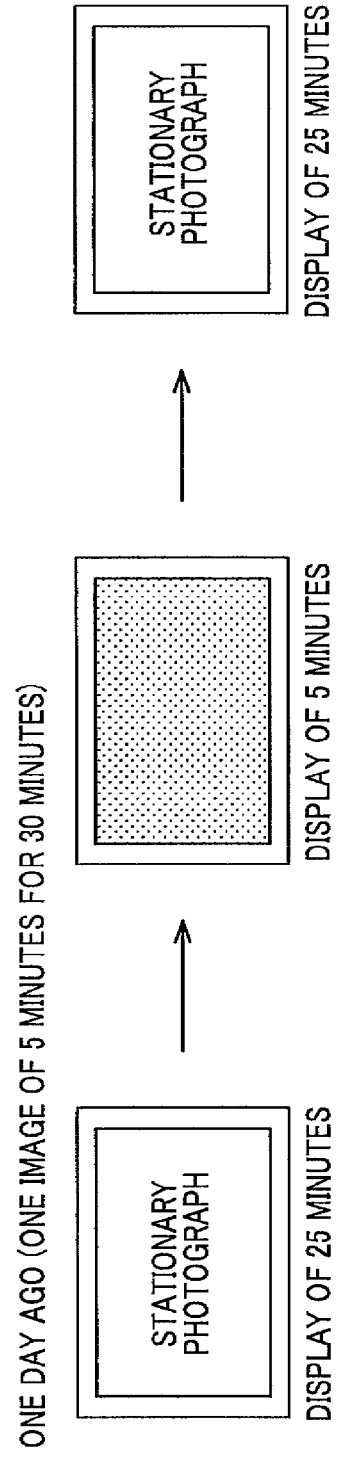

Concretely, when the present date becomes one month before the event, as shown in FIG. 14A, the display unit 11 displays the stationary photographic image for five hours and 55 minutes out of six hours and displays one related image for the following five minutes in place of the stationary photographic image. The display unit 11 displays another related image for the following six hours at the same display ratio. Hereinafter, the display unit 11 repeats similar displaying operation every six hours. When the present date becomes one day before the event, as shown in FIG. 14B, the display unit 11 displays the stationary photographic image for 25 minutes out of 30 minutes and displays a related image for the following five minutes in place of the stationary photographic image. Hereinafter, the display unit 11 repeats similar displaying operation every 30 minutes. As described above, as the present date approaches the date of the event, the display interval of the related image in the single display mode decreases, and the display time of the related image in the display time of the stationary photographic image increases. Therefore, reminding effect is provided, and the feeling of the user is gradually uplifted, and better atmosphere can be generated.

In the foregoing embodiment, the past related images which are related to an event are displayed before the date of the event. Therefore, image reproduction producing event reminding effect and creating atmosphere for better family communication can be realized.

As the present date approaches the date of the event, the display ratio of the related image increases. Consequently, image reproduction which gradually uplifts the feeling of the user and creates better atmosphere can be realized.

As the present date approaches the date of the event, the number of related images displayed increases in the slide show mode or the multi-display mode. Therefore, image reproduction which gradually uplifts the feeling of the user and creates better atmosphere can be realized.

In addition, as the present date approaches the date of the event, the display time of the related image increases in the single display mode. Therefore, the feeling of the user can be gradually uplifted, and image reproduction with increased reminding effect can be realized.

The embodiments can be modified and changed without departing from the gist of the present invention.

For example, a related image may be retrieved at the time of reminding the user of the event date (between steps S31 and S32).

The display ratio of the related images may be changed according to the number of related images. Specifically, when the related images of the event, of the number exceeding given number are retrieved, the display ratio of the related images with respect to the photographic images to be reproduced may be increased. For example, when 100 or more related images are retrieved, the display ratio of the related images may be increased from 30% to 60%.

In the case where the kind of an event is, for example, wedding anniversary, in addition to a photographic image of the date of wedding (November 22), photographic images of the date (November 22) of the previous year of the date of wedding and the date (November 22) of the year after the date of wedding may be displayed. Photographic images of every year after the date of wedding, or photographic images every few years since the date of wedding may be displayed. In this case, photographic images of every year may be set by default. According to a setting, photographic images every few years or the photographic images on only the date of wedding may be displayed.

In the case where the kind of an even is, for example, birthday of a child, when the age of the child is less than predetermined age, for example, when the present date is only after one or two years since the birth of the child, photographic images may be displayed after one month, two months, . . . since the date specified as the birthday.

Figure 17:
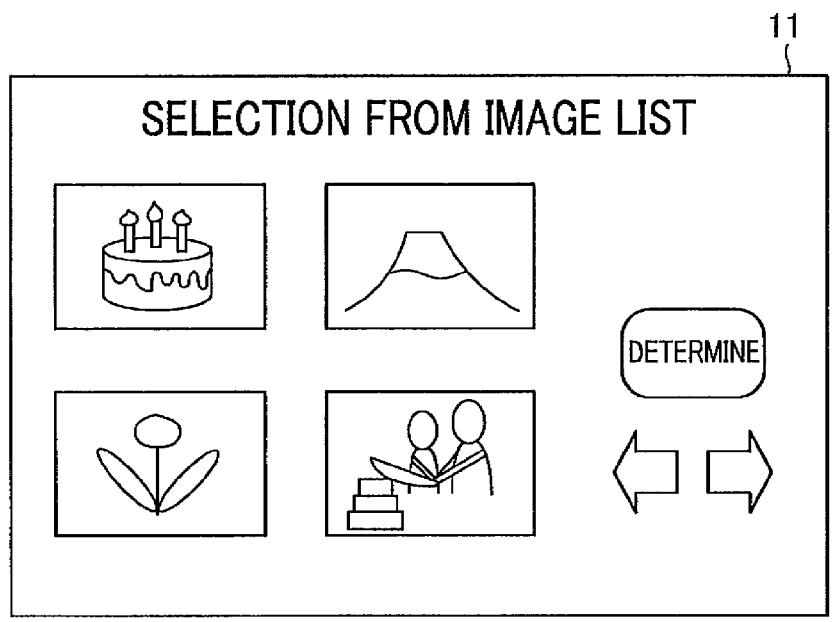
FIG. 17 is a schematic view of a display screen for selecting images from an image list.

When the present date becomes after the date of the event, the related image does not have to be displayed at all or display of the related image may be decreased. After setting of the date of an event (S15), the control unit 15 may retrieve an image whose date of capture coincides the event date and display a list of retrieved images on the GUI screen of the display unit 11 as shown in FIG. 17. The user may select an image from the image list and determine a related image. In this case, the images in the image list are set as GUI buttons.

What is claimed is:

1. An image reproducing apparatus for reproducing and displaying images while switching the images, comprising:
    an event information setting device configured to set event information including date of an event;
    a retrieving device configured to retrieve a related image from images stored in a storing device on the basis of the event information set by the event information setting device;
    a period calculating device configured to calculate an event waiting period for the related image from present date to date of the event;
    a display ratio determining device configured to determine a display ratio for inserting the related image retrieved by the retrieving device into images to be reproduced on the basis of the event waiting period calculated by the period calculating device; and
    a display control device configured to display an event related image group obtained by inserting the related image into the images to be reproduced at the display ratio determined by the display ratio determining device,
    wherein the display ratio determining device increases the number of related images displayed out of the number of images to be reproduced as the event waiting period calculated by the period calculating device becomes shorter.

2. The image reproducing apparatus according to claim 1, wherein the display ratio determining device increases the display ratio of the related image as the event waiting period calculated by the period calculating device becomes shorter.

3. The image reproducing apparatus according to claim 2, wherein the display ratio determining device increases display time of the related image out of display time of the images to be reproduced as the event waiting period calculated by the period calculating device becomes shorter.

4. The image reproducing apparatus according to claim 1, wherein the retrieving device retrieves the related image by collating the event information set by the event information setting device with image attachment information which is stored so as to be associated with an image.

5. The image reproducing apparatus according to claim 1, wherein the retrieving device retrieves related information stored in the storing device on the basis of the event information, and
    the display control device displays the related information simultaneously with display of the event related image group.

6. The image reproducing apparatus according to claim 1, wherein the event is made of a plurality of events, and
    the display ratio determining device compares event waiting periods of the plurality of events, and increases the display ratio of event related images in order from the shortest event waiting period.

7. An image reproducing method of reproducing images while switching the images, comprising:
    an event information setting step of setting event information including date of an event;
    a retrieving step of retrieving a related image from a stored image on the basis of the event information set in the event information setting step;
    a period calculating step of calculating an event waiting period for the related image from present date to date of the event;
    a display ratio determining step of determining a display ratio for inserting the retrieved related image into images to be reproduced on the basis of the event waiting period calculated in the period calculating step; and
    a display control step of displaying an event related image group obtained by inserting the related image into the images to be reproduced at the display ratio,
    wherein the display ratio determining step comprises increasing the number of related images displayed out of the number of images to be reproduced as the event waiting period calculated in the period calculating step becomes shorter.

8. A non-transitory computer-readable recording medium recording a program to be performed, the program making a computer function as:
    an image reproducing device configured to reproduce images while switching the images;
    an event information setting device configured to set event information including date of an event;
    a retrieving device configured to retrieve a related image from an image stored in a storing device on the basis of the event information set by the event information setting device;
    a period calculating device configured to calculate an event waiting period for the related image from present date to date of the event;
    a display ratio determining device configured to determine a display ratio for inserting the related image retrieved by the retrieving device into images to be reproduced on the basis of the event waiting period calculated by the period calculating device; and
    a display control device configured to display an event related image group obtained by inserting the related image into the images to be reproduced at the display ratio,
    wherein the display ratio determining device increases the number of related images displayed out of the number of images to be reproduced as the event waiting period calculated by the period calculating device becomes shorter.

* * * * *